United States Patent [19]

Connelly

[11] Patent Number: 4,830,990

[45] Date of Patent: May 16, 1989

[54] GLASS FOR PROJECTION CATHODE RAY TUBE FACEPLATE

[75] Inventor: John H. Connelly, Horseheads, N.Y.

[73] Assignee: Corning Glass Works, Corning, N.Y.

[21] Appl. No.: 238,575

[22] Filed: Aug. 31, 1988

[51] Int. Cl.[4] ............ C03C 3/095; C03C 3/078; C03C 3/085; C04B 35/68

[52] U.S. Cl. .................................... 501/64; 501/69; 501/70; 501/72; 313/480; 252/478

[58] Field of Search ............... 501/64, 69, 70, 72; 313/480; 252/478

[56] References Cited

U.S. PATENT DOCUMENTS

| | | | |
|---|---|---|---|
| 4,331,770 | 5/1982 | Thompson | 501/64 |
| 4,337,410 | 6/1982 | van der Geer et al. | 501/64 |
| 4,734,388 | 3/1988 | Cameron et al. | 501/72 |

FOREIGN PATENT DOCUMENTS 0131399  1/1985  European Pat. Off. ............ 501/64

Primary Examiner—Mark L. Bell
Attorney, Agent, or Firm—Clinton S. James, Jr.

[57] ABSTRACT

This invention relates to glass compositions especially suitable for projection cathode ray tube faceplates which are essentially free from PbO and other readily reducible metal oxides, fluorine, ZnO, $TiO_2$, and MgO, and which consist essentially, in weight percent, of

| | | | |
|---|---|---|---|
| $Li_2O$ | 0.75–3 | $Li_2O + Na_2O + K_2O$ | 11–16 |
| $Na_2O$ | 5–7 | $CaO + SrO + BaO$ | 21.5–26 |
| $K_2O$ | 5–7 | $Al_2O_3$ | 1–2 |
| SrO | 7.5–10 | $ZrO_2$ | 2–7 |
| BaO | 14–16 | $CeO_2$ | 0.4–0.8 |
| CaO | 0–3 | $SiO_2$ | 55–60. |

2 Claims, No Drawings

GLASS FOR PROJECTION CATHODE RAY TUBE FACEPLATE

BACKGROUND OF THE INVENTION

This invention is directed to the production of glass compositions suitable for use as faceplates for projection cathode ray tubes; i.e., television picture tubes used to project images on a large screen. Faceplates for use in projection cathode ray tubes have been commercially fabricated for a number of years from glasses having compositions encompassed within U.S. Pat. No. 4,277,286. The preferred glasses disclosed in that patent consisted essentially, in weight percent, of:

| $SiO_2$ | 48–53 | $K_2O$ | 5–6 | SrO | 3–7 |
|---|---|---|---|---|---|
| $Al_2O_3$ | 1–2 | $CeO_2$ | 0.4–0.8 | BaO | 14–16 |
| ZnO | 7–11 | $TiO_2$ | 0.5–1.0 | CaO + SrO + BaO | 18–24 |
| $Li_2O$ | 1–3 | $ZrO_2$ | 2–7 | $Li_2O + Na_2O + K_2O$ | 11–16 |
| $Na_2O$ | 5–7 | CaO | 0–3 | | |

Those glasses exhibited exceptional absorptions of X-radiation (linear X-ray absorption coefficients at 0.6Å of at least 35 $cm^{-1}$) and very little browning from subjection to high velocity electron impingement. Those glasses do, however, demonstrate one undesirable feature; viz., faceplates prepared therefrom appear to be slightly yellow to the eye. This yellow coloration, caused by absorption in the blue end of the visible radiation spectrum, renders it necessary for the electron gun utilized in developing the blue color in the projection television system to be run "harder," i.e., to be operated at a higher voltage, than the electron guns used for generating the red and green colors. Hence, the yellow color is not only undesirable from an aesthetic standpoint, but also from a tube operation point of view.

Therefore, the principal objective of the present invention was to devise glass compositions having the exceptional absorption of X-radiation and resistance to browning resulting from the impingement of high velocity electrons demonstrated by the glasses of U.S. Pat. No. 4,277,286, but which would exhibit essentially no yellow color to the eye.

SUMMARY OF THE INVENTION

As was observed in U.S. Pat. No. 4,277,286, a glass designed for use as a cathode ray tube faceplate must possess a critical matrix of electrical and physical properties. Thus, the patent cited five properties which are required in faceplate glasses:

(a) the electrical resistivity of the glass, when measured at 350° C., must be at least $10^7$ ohm-cm;

(b) the linear coefficient of thermal expansion (0°–300° C.) must not exceed $102 \times 10^{-7}/°C.$, and will preferably range between $95–100 \times 10^7/°C.$;

(c) the internal liquidus of the glass will be less than 900° C.;

(d) the strain point of the glass will not exceed 500° C.; and (e) the softening point of the glass will be no higher than 690° C.

To achieve those electrical and physical properties, the patent defines base compositions within the $R_2O$—RO—ZnO—$ZrO_2$—$SiO_2$ system wherein the ranges of the individual ingredients are quite narrowly delimited. (As employed in the patent, $R_2O$ represents $Li_2O + Na_2O + K_2O$ and RO consists of CaO + SrO + BaO). A combination of $CeO_2 + TiO_2$ was employed to inhibit browning discoloration when the glass was exposed to X-radiation.

I have found that the objectionable yellow color can be eliminated from the preferred glass compositions of U.S. Pat. No. 4,277,286, thereby substantially improving the visible transmission of the glass, by removing $TiO_2$ from the composition. Then, in order to insure against browning of the glass when subjected to high velocity electrons, I have found that ZnO must be excluded from the composition and additional SrO substituted at least in part therefor to maintain the required X-radiation absorption character. Maintenance of the above-described matrix of electrical and physical properties which must be demonstrated by glasses designed for cathode ray tube faceplates is achieved through minor modifications in the concentrations of the other ingredients.

In summary, I have found that glasses eminently suitable for use as faceplates for projection cathode ray tubes in being essentially free from a yellow color, in exhibiting linear X-radiation absorption coefficients at a wavelength of 0.6Å of at least 35 $cm^1$, while displaying essentially no browning discoloration upon being subjected to high velocity electrons, and in demonstrating an electrical resistivity at 350° C. of at least $10^7$ ohm-cm, a linear coefficient of thermal expansion (0°–300° C.) not greater than $102 \times 10^{-7}/°C.$, preferably between $95–100 \times 10^{-7}/°C.$, an internal liquidus less than 900° C., a strain point not in excess of 500° C., and a softening point no higher than 690° C. can be produced from compositions essentially free from PbO and other readily reducible metal oxides, fluorine, ZnO, $TiO_2$, and MgO, and which consist essentially, expressed in terms of weight percent on the oxide basis, of:

| $Li_2O$ | 0.75–3 | $Li_2O + Na_2O + K_2O$ | 11–16 |
|---|---|---|---|
| $Na_2O$ | 5–7 | CaO + SrO + BaO | 21.5–26 |
| $K_2O$ | 5–7 | $Al_2O_3$ | 1–2 |
| SrO | 7.5–10 | $ZrO_2$ | 2–7 |
| BaO | 14–16 | $CeO_2$ | 0.4–0.8 |
| CaO | 0–3 | $SiO_2$ | 55–60 |

Where the use of a fining agent is deemed desirable, $Sb_2O_3$, rather than $As_2O_3$, will be selected because it is less readily reduced. Colorants conventionally used in cathode ray tube faceplate glasses, e.g., $Co_3O_4$, $Cr_2O_3$, and NiO, may be included in the customary levels, but, inasmuch as images from projection cathode ray tubes are not viewed directly, colorants are normally omitted from faceplates used in such tubes.

PRIOR ART

U.S. Pat. No. 4,734,388 provides a fairly extensive survey of glass compositions wherein $ZrO_2$ is utilized in conjunction with SrO and BaO to impart high X-radiation absorption to a glass. None of the references, however, defines glasses expressly encompassed within the sharply delimited composition intervals of the present inventive glasses. U.S. Pat. No. 4,277,286 is considered to be the most pertinent disclosure to the glasses of the instant invention.

DESCRIPTION OF PREFERRED EMBODIMENTS

Table I presents a number of glass compositions, expressed in terms of parts by weight on the oxide basis, illustrating the parameters of the instant invention. Inasmuch as the sum of the individual components totals or very closely approximates 100, for all practical purposes each of the recorded values may be deemed to reflect weight percent. The actual batch ingredients may comprise any materials, either oxides or other compounds, which, when melted together, will be converted into the desired oxides in the proper proportions.

The batch constituents were compounded, ballmilled together to assist in securing a homogeneous melt, and charged into platinum crucibles. After placing lids thereon, the crucibles were introduced into a furnace operating at about 1500° C. After melting for about four hours with occasional stirring, the melts were allowed to stand for about 15 minutes to fine the glass. Thereafter, the melts were poured into steel molds to form glass slabs having dimensions of about 6"×6"×0.5", and those slabs were transferred immediately to an annealer operating at about 520° C.

Whereas the above description reflects laboratory practice, it will be appreciated that the compositions recited in Table I could be melted and formed in much larger quantities employing conventional commercial melting units and glass forming techniques. $Sb_2O_3$ was included in the batches to perform its function as a fining agent.

TABLE I

|  | 1 | 2 | 3 |
|---|---|---|---|
| $SiO_2$ | 51.51 | 52.32 | 57.53 |
| $Al_2O_3$ | 1.70 | 1.70 | 1.73 |
| $Na_2O$ | 6.91 | 6.91 | 6.31 |
| $K_2O$ | 5.10 | 5.10 | 5.71 |
| $Li_2O$ | 1.00 | 1.00 | 0.99 |
| BaO | 14.90 | 14.90 | 15.02 |
| SrO | 6.40 | 6.40 | 8.66 |
| ZnO | 7.60 | 7.60 | — |
| $ZrO_2$ | 3.00 | 3.00 | 2.99 |
| $CeO_2$ | 0.66 | 0.66 | 0.66 |
| $TiO_2$ | 0.82 | 0.01 | — |
| $Sb_2O_3$ | 0.40 | 0.40 | 0.40 |

The minute amount of $TiO_2$ in Example 2 represents an impurity present in the batch materials. $TiO_2$ was purposely included in Example 1 only.

Specimens were cut from the above glass slabs and Table II lists measurements of electrical and physical properties carried out on those specimens employing techniques conventional in the glass art. The softening point (Soft), annealing point (Ann), and strain point (Str) are reported in °C.; the linear coefficient of thermal expansion over the 0°–300° C. interval (Exp) is recorded in terms of $\times 10^{-7}/°C$.; the internal liquidus (Liq) is tabulated in °C.; the electrical resistivity measured at 350° C. is expressed in terms of $\text{Log } \rho$; and the linear X-ray absorption coefficient at 0.6Å (Abs) is entered in terms of $cm^{-1}$.

TABLE II

|  | 1 | 2 | 3 |
|---|---|---|---|
| Soft | 679 | 678 | 675 |
| Ann | 512 | 506 | 493 |
| Str | 471 | 473 | 452 |
| Exp | 96.5 | 96.2 | 97 |
| Liq | 800 | 797 | 887 |
| Log$\rho$ | 7.925 | 7.900 | 7.670 |
| Abs | 39.8 | 39.8 | 35.5 |

Visible transmittance spectra were measured spectrophotometrically on samples of Examples 1, 2, and 3 having thicknesses approximating 6.35 mm. Example 1 showed absorption beginning at a wavelength of about 500 nm which became quite pronounced at about 450 nm, resulting in about a 15% loss of blue from the spectrum and thereby leading to the yellow coloration perceived by the eye. In contrast, the spectra exhibited by Examples 2 and 3 evidenced essentially no absorption across the visible portion of the radiation spectrum.

As can be observed from Table I, Example 1 contained ZnO and $TiO_2$; Example 2 contained ZnO, but was essentially free from $TiO_2$; and Example 3 was free from both ZnO and $TiO_2$. The above spectra measurements clearly illustrate that the removal of $TiO_2$ from the glass composition eliminated the absorption of transmission in the blue end of the visible spectrum.

Visible transmittance spectra were measured spectrophotometrically on samples of Examples 2 and 3 which had been cut from the faceplate of a television projection tube. The tubes had no screens in them, but were aluminized and exhausted normally. The tubes were aged in conventional commercial projection tube aging racks for about 29.5 hours, resulting in an accumulated electron charge of 1.65 coulombs/$cm^2$.

Example 2 exhibited a loss in transmission greater than 15% across the visible portion of the spectrum to a wavelength of approximately 500 nm with a somewhat further loss below 450 nm. A definite brownish cast in the sample was apparent to the eye. In contrast, Example 3 exhibited a loss in transmission less than 10% across the visible portion of the spectrum to a wavelength of approximately 450 nm with a slight further loss down to 400 nm. Essentially no brownish discoloration was discernible in the glass.

The above spectra measurements clearly illustrate that the removal of ZnO from the glass composition is necessary to produce glasses demonstrating good resistance to electron browning.

I claim:

1. A glass essentially free from PbO and other readily reducible metal oxides, fluorine, ZnO, $TiO_2$, and MgO, which is free from a yellow color, and which exhibits a linear X-radiation absorption coefficient at a wavelength of 0.6Å of at least 35 $cm^{-1}$, essentially no browning discoloration upon being subjected to high velocity electrons, an electrical resistivity at 350° C. of at least $10^7$ ohm-cm, a linear coefficient of thermal expansion (0°–300° C.) not in excess of $102 \times 10^{-7}/°C$., an internal liquidus below 900° C., a strain point not over 500° C., and a softening point no higher than 690° C., said glass consisting essentially, expressed in terms of weight percent on the oxide basis, of

| $Li_2O$ | 0.75–3 | $Li_2O + Na_2O + K_2O$ | 11–16 |
|---|---|---|---|
| $Na_2O$ | 5–7 | CaO + SrO + BaO | 21.5–26 |
| $K_2O$ | 5–7 | $Al_2O_3$ | 1–2 |
| SrO | 7.5–10 | $ZrO_2$ | 2–7 |
| BaO | 14–16 | $CeO_2$ | 0.4–0.8 |
| CaO | 0–3 | $SiO_2$ | 55–60. |

2. A faceplate for a projection cathode ray tube consisting of a glass essentially free from PbO and other readily reducible metal oxides, fluorine, ZnO, $TiO_2$, and MgO, which is free from a yellow color, and which exhibits a linear X-radiation absorption coefficient at a wavelength of 0.6Å of at least 35 $cm^{-1}$, essentially no browning discoloration upon being subjected to high velocity electrons, an electrical resistivity at 350° C. of at least $10^7$ ohm-cm, a linear coefficient of thermal expansion (0°–300° C.) not in excess of $102 \times 10^{-7}/°C$., an internal liquidus below 900° C., a strain point not over 500° C., and a softening point no higher than 690° C., said glass consisting essentially, expressed in terms of weight percent on the oxide basis, of

| | | | |
|---|---|---|---|
| Li$_2$O | 0.75–3 | Li$_2$O + Na$_2$O + K$_2$O | 11–16 |
| Na$_2$O | 5–7 | CaO + SrO + BaO | 21.5–26 |
| K$_2$O | 5–7 | Al$_2$O$_3$ | 1–2 |
| SrO | 7.5–10 | ZrO$_2$ | 2–7 |
| BaO | 14–16 | CeO$_2$ | 0.4–0.8 |
| CaO | 0–3 | SiO$_2$ | 55–60. |

* * * * *